United States Patent
Verduijn et al.

(10) Patent No.: US 6,821,503 B1
(45) Date of Patent: Nov. 23, 2004

(54) MOLECULAR SIEVES AND PROCESSES FOR THEIR MANUFACTURE

(75) Inventors: Johannes Petrus Verduijn, deceased, late of Oostvoorne (NL); by Jannetje Maatje van den Berge, legal representative, Oostvoorne (NL); Machteld Maria Wilfried Mertens, Boortmeerbeek (BE); Wilfried Jozef Mortier, Kessel-Lo (BE); Marcel Johannes Janssen, Kessel-Lo (BE); Cornelis Wilhelmus Maria Van Oorschot, Brasschaat (BE); David E. W. Vaughan, State College, PA (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/744,715
(22) PCT Filed: Jul. 28, 1999
(86) PCT No.: PCT/GB99/02462
§ 371 (c)(1),
(2), (4) Date: Aug. 10, 2001
(87) PCT Pub. No.: WO00/06492
PCT Pub. Date: Feb. 10, 2000

(30) Foreign Application Priority Data

Jul. 29, 1998 (GB) .............................................. 9816508

(51) Int. Cl.$^7$ ............................................. C01B 39/02
(52) U.S. Cl. ...................................... 423/709; 423/716
(58) Field of Search .................................. 423/709, 305, 423/306, 328.1, 328.2, 335, 716

(56) References Cited

U.S. PATENT DOCUMENTS

| | | | | |
|---|---|---|---|---|
| 4,164,551 A | * | 8/1979 | Elliott, Jr. .................... | 423/709 |
| 4,173,622 A | * | 11/1979 | Robertson .................... | 423/709 |
| 4,385,042 A | * | 5/1983 | Whitehurst et al. .......... | 423/711 |
| 5,370,859 A | * | 12/1994 | MacLaine-Cross .......... | 423/709 |
| 5,672,331 A | * | 9/1997 | Verduijn ...................... | 423/702 |
| 5,989,518 A | * | 11/1999 | Tannous et al. ............. | 423/717 |

FOREIGN PATENT DOCUMENTS

| | | |
|---|---|---|
| EP | 0110650 | 6/1984 |
| EP | 0202797 | 4/1986 |
| GB | 2132597 A | 7/1985 |
| WO | WO9308124 A | 4/1993 |
| WO | WO9308125 | 4/1993 |
| WO | Wo9425152 | 11/1994 |
| WO | WO9703020 | 1/1997 |

OTHER PUBLICATIONS

Gora, Leszek and Thompson, Robert W., *Investigations of Secondary Nucleation by Initial Breeding in Clear Solution Zeolite NaA Systems*, Zeolites 15:526–534, 1995.

* cited by examiner

Primary Examiner—David Sample

(57) ABSTRACT

Crystalline molecular sieve particles of a size suitable for use as seeds in molecular sieve manufacture are obtained by washing larger particle sized product to dislodge smaller particles from the larger.

16 Claims, No Drawings

MOLECULAR SIEVES AND PROCESSES FOR THEIR MANUFACTURE

This invention relates to molecular sieves and processes for their manufacture. More especially it relates to processes in which synthesis mixtures are seeded to control process conditions and product characteristics. The invention relates primarily to the manufacture of zeolites and other crystalline molecular sieves. Examples of the latter include phosphorus-containing molecular sieves whether or not they have zeolite analogues.

It is well-known that seeding a molecular sieve synthesis mixture frequently has beneficial effects, for example in controlling the particle size of the product, avoiding the need for an organic template, accelerating synthesis, and improving the proportion of product that is of the intended structure type. Colloidal seeds have proved especially effective—see, for example, International Application Nos. WO 97/03020 and 03021, and EP-A-753483, 753484 and 753485.

Whereas procedures for the preparation of colloidal dispersions of certain structure types have been described in the above-mentioned references, and similar procedures are effective in the preparation of colloidal dispersions of crystalline molecular sieves of other structure types, these procedures have proved ineffective in the preparation of colloidal dispersions of certain further structure types, especially LEV.

As used in this specification, the term "structure type" is used in the sense described in the Structure Type Atlas, Zeolites 17, 1996.

It has now been found that for many structure types a process for manufacturing a crystalline molecular sieve produces a product of a desired, larger, particle size, which 35 particles have much smaller particles, of a size suitable for use as seeds in subsequent manufacturing processes, adhering loosely to them.

The present invention accordingly provides in a first aspect a process for the manufacture of seed crystals of a molecular sieve, which comprises synthesizing the molecular sieve by treatment f an appropriate synthesis mixture, separating from the treated synthesis mixture a crystalline molecular sieve comprising particles of a first, larger, particle size in admixture with particles of a second, smaller, size suitable for use as seed crystals, and treating the crystalline molecular sieve to separate the larger particles from the smaller particles.

In a second aspect, the invention provides a process for the manufacture of a crystalline molecular sieve by treatment of a synthesis mixture appropriate for the formation of that molecular sieve, wherein the mixture contains as seeds separated smaller particles obtainable by, and preferably obtained by, the process of the first aspect of the invention.

In a third aspect, the invention provides the use of seed crystals obtainable by, and preferably obtained by, the process of the first aspect to accelerate the rate of production of a crystalline molecular sieve by treatment of a synthesis mixture.

In a fourth aspect, the invention provides the use of seed crystals obtainable by, and preferably obtained by, the process of the first aspect to control a characteristic, for example the purity, the phase purity, the particle shape, the particle size, or the particle size distribution, of a crystalline molecular sieve produced by treatment of a synthesis mixture.

In a fifth aspect, the invention provides the use of seed crystals obtainable by, and preferably obtained by, the process of the first aspect to facilitate the manufacture of a crystalline molecular sieve by treatment of a synthesis mixture substantially free from organic structure-directing agent (template).

In a sixth aspect, the invention provides the use of seed crystals obtainable by, and preferably obtained by, the process of the first aspect to facilitate the manufacture of a crystalline molecular sieve by treatment of a synthesis mixture, without stirring, at least after the desired synthesis temperature has been reached.

Referring now in more detail to the first aspect of the invention, it will be appreciated that it is applicable to all crystalline molecular sieve structure types, and to all processes for the manufacture of a crystalline molecular sieve of such a structure type, in which the initial product of synthesis is a product containing smaller particles adhering to the larger particles. To establish applicability requires only a simple routine experiment. In one such routine experiment, which is also a preferred method of obtaining the seed crystals, the synthesis mixture containing the crystalline molecular sieve product is centrifuged and the solids washed in, advantageously deionized, water, a two-stage procedure which is repeated a number of times. If the first aspect of the invention is applicable, the supernatant water after washing will not be clear.

It has been observed that in some systems while the first wash water may sometimes be clear, and may contain no or very few dispersed crystalline molecular sieve particles, the second or subsequent wash water is in contrast not clear, and has a measurable solids content.

The procedure yields hazy supernatants after various numbers of repetitions (depending both on the system and the relative sizes of the sample and the washing water); with some systems as many as 8 may be required; 2 to 5 is typical.

Among the structure types to which the first aspect of the invention is applicable, there may be mentioned LEV, FER, TON, MFI, MFS and MOR.

Among the specific examples within the structure types, there may be mentioned Levyne, ZK-20, NU-3 and ZSM-45 (LEV), ferrierite, ZSM-21, ZSM-35, ZSM-38, NU-23, FU-9, or ISI-6, (FER), ZSM-22, NU-10, ISI-1 or KZ-2 (TON), TS-1 (MFI), ZSM-57 (MFS) and Mordenite (MOR). Using the specific examples of the products of the first aspect of the invention, there may be prepared, in the remaining aspects, those specific examples and, in addition, many others.

As indicated above, separation of the smaller particles, hereinafter termed "washwater seeds", from the larger particles may be carried out by repeated washing of the crystalline product obtained from the synthesis mixture until the supernatant wash water is hazy. Advantageously, the seeds are recovered not earlier than the second wash to limit contamination by unreacted starting materials remaining in the synthesis mixture, and preferably the suspension of washwater seeds is substantially free of such materials.

Other separations may be effected by subjecting the synthesis mixture to fractionation, low speed centrifuging, gel permeation, surfactant treatment, ammonia treatment, or: a combination of the two last mentioned.

(Although separation is advantageously complete, it is, within the scope of the invention to produce washwater seeds admixed with a small proportion of the larger particles.)

The washwater seeds, however separated, are found to have particle sizes in the range 20 to 500 nm (the smallest dimension being measured), and as such can be regarded as colloidal. The particle size of the recovered seeds may be controlled by, for example, varying the speed of the centrifuge. The seeds are advantageously used in the form of a dispersion in the separating medium, advantageously water although, in a presently less preferred alternative, they may be dried and added to a subsequent synthesis mixture in any form, provided they are not treated in any way, for example calcining, that reduces their seeding activity.

As used herein, the term "colloidal", when used of a suspension, refers to one containing discrete finely divided particles dispersed in a continuous liquid phase and preferably refers to a suspension that is stable, in the sense that no visible separation occurs or sediment forms, in a period sufficient for the use intended, advantageously for at least 10, more advantageously at least 20, preferably at least 100, and more preferably at least 500, hours at ambient temperature (23° C.)

In each of the second and subsequent aspects of the invention, the washwater seeds are incorporated in a In synthesis mixture that is otherwise as known in the art or as described in the literature for the production of the molecular sieve concerned. This is also the case for the conditions of treatment, except that the use of washwater seeds makes possible reduced reaction times and may obviate stirring if that were otherwise necessary.

The seeds are advantageously stirred into the synthesist mixture for a time sufficient to provide a uniform dispersion, this time being dependent primarily on the viscosity of the synthesis mixture, but ranging generally from 30 seconds to 10 minutes.

The concentration of seeds in the washwater may advantageously be within the range of 0.001% to 20%, preferably within the range of 0.01% to 0.15%, and most preferably from 0.05 to 0.1%, by weight. The washwater is advantageously added to the subsequent synthesis mixture in;

such a proportion that the synthesis mixture contains the seeds at a concentration of up to 10000, advantageously at most 3000, more advantageously at most 1500, and preferably at most 1000, more preferably at most 500, and most preferably at most 350 ppm, based on the total weight of the synthesis mixture. A minimum seeding level is generally 1 ppb (0.001 ppm), advantageously at least 0.1, more advantageously at least 1, and preferably at least 10, ppm, based on the total weight of the synthesis mixture. Advantageous ranges of proportions are from 1 to 2000, preferably 100 to 1500, and most preferably 100 to 350, ppm.

In general, the seeds will be of the same molecular sieve structure type as the desired product of the second and subsequent aspects of the invention, and in many cases the seeds and the product will be the same molecular sieve, although not necessarily of identical composition.

In general, the treatment of the synthesis mixture to yield the desired crystalline molecular sieve, usually termed hydrothermal treatment, though strictly that term should be used only for treatments in which there is vapour-phase water present, is advantageously carried out under autogenous pressure, for example in an autoclave, for example a stainless steel autoclave which may, if desired, be ptfe-lined. The treatment may, for example, be carried out at a temperature within the range of from 50, advantageously from 90, especially 120, to 250° C., depending on the molecular sieve being made. The treatment may, for example, be carried out for a period within the range of from 20 to 200 hours, preferably up to 100 hours, again depending on the molecular sieve being formed. The procedure may include an ageing period, either at room temperature or, preferably, at a moderately elevated temperature, before the hydrothermal treatment at more elevated temperature. The latter may include a period of gradual or stepwise variation in temperature.

For certain applications, the treatment is carried out with stirring or with rotating the vessel about a horizontal axis (tumbling). For other applications, static hydrothermal treatment is preferred. If desired, the synthesis mixture may be stirred or tumbled during an initial part of the heating stage, for example, from room temperature to an elevated, e.g., the final treatment, temperature, and be static for the remainder. Agitation generally produces a product with a smaller particle size and a narrower particle size distribution than static hydrothermal treatment.

The invention also provides the products of the processes and of the uses of the earlier aspects of the invention. In addition to their use as seed crystals, the washwater seeds, re-suspended after drying or preferably from their as-manufactured suspension, may be used in the manufacture of molecular sieve, especially zeolite, supported layers or membranes, for example those described in International Application No. WO 94/25151, as may the products of the remaining aspects of the invention. Other uses for the washwater seeds include all those for which colloidal seeds are suitable. The products of the remaining aspects of the invention, if required after cation exchange and/or calcining, have utility as catalyst precursors, catalysts, and separation and absorption media. They are especially useful in numerous hydrocarbon conversions, separations and absorptions. They may be used alone, or in admixture with other molecular sieves, in particulate form, supported or unsupported, or in the form of a supported layer, for example in the form of a membrane, for example as described in WO 94/25151. Hydrocarbon conversions include, for example, cracking, reforming, hydrofining, aromatization, oligomerisation, isomerization, dewaxing, and hydrocracking (e.g., naphtha to light olefins, higher to lower molecular weight hydrocarbons, alkylation, transalkylation, disproportionation or isomerization of aromatics) Other conversions include the reaction of alcohols with olefins and the conversion of oxygenates to hydrocarbons.

Conversion of oxygenates may be carried out with the oxygenate, e.g., methanol, in the liquid or, preferably, the vapour phase, in batch or, preferably, continuous mode. When carried out in continuous mode, a weight hourly space velocity (WHSV) based on oxygenate, of advantageously 1 to 1000, preferably 1 to 100, hour$^{-1}$ may conveniently be used. An elevated temperature is generally required to obtain economic conversion rates, e.g., one between 300 and 600° C., preferably from 400 to S00° C., and more preferably about 450° C. The catalyst may be in a fixed bed, or a dynamic, e.g., fluidized or moving, bed.

The oxygenate feedstock may be mixed with a diluent, inert under the reaction conditions, e.g., argon, nitrogen, carbon dioxide, hydrogen, or steam. The concentration of methanol in the feedstream may vary widely, e.g., from 5 to 90 mole per cent of the feedstock. The pressure may vary within a wide range, e.g., from atmospheric to 500 kPa.

EXAMPLES

The following Examples, in which all parts and percentages are by weight unless otherwise stated, illustrate various aspects of the invention. Unless otherwise indicated, the purity and type of starting materials are as given at their first occurrence. References to water are to deionized water.

Part A—Preparation of Washwater Seeds

Example 1

Preparation of LEV washwater seeds.

This example illustrates the manufacture of a LEV-type zeolite of particle size suitable for use as seeds.

In a first stage, 15.95 parts of sodium aluminate (53% $Al_2O_3$, 41% $Na_2O$, 6% $H_2O$), 19.95 parts of sodium hydroxide (98.6%) and 5.58 parts of potassium hydroxide (87.4%) were dissolved in 151.06 parts of water, and heated to boiling until a clear solution was obtained. After cooling to room temperature, water was added to compensate for the loss during boiling, to form Solution A. 270.60 parts of colloidal silica (Ludox HS40, 40% SiO2) were mixed with 106.12 parts of choline chloride template forming a viscous mass. Solution A was added with stirring using 190.00 parts of water as rinse water, stirring then continuing for a further 5 minutes. The molar composition was:

1.95 $Na_2O$: 0.24 $K_2O$: 0.46 $Al_2O_3$: 10 $SiO_2$: 4.187 choline chloride: 155 $H_2O$.

To 290 parts of this mixture, 0.49 parts of conventional size LEV zeolite were added and mixed with the gel, and a sample transferred to an autoclave, where it was heated in a 120° C. oven for 144 hours. The product was washed, recovered by centrifuging and dried overnight at 120° C. The product comprised spherical aggregates of from 2 to 2.5 μm, made up of ~100 nm particles, with an X-ray diffraction pattern (XRD) of ZSM-45, a zeolite of LEV-type structure, as described in EP-A-107 370 (Mobil).

The product was used as seeds in the next stage, in which 8.38 parts of sodium aluminate, 10.53 parts of sodium: hydroxide, 2.96 parts of potassium hydroxide, and 78.95 parts of water were treated as described above to form a Solution A. Solution A was then added, using 100 parts of rinse water, to a mixture of 142.42 parts of colloidal silica and 55.5 parts of choline chloride, and stirred as described above, with the addition of 0.68 parts of the first stage seeds. The reaction mixture was heated in an autoclave at 120° C. for 174 hours, the product recovered by washing, centrifuging and drying having an XRD similar to that of the first stage. The second supernatant of the washing procedure was not clear, and had a pH of 10.3. It was found to be a dispersion with a solids content of 2.3%. Analysis by scanning electron microscopy (SEM) and XRD showed-100 nmr non-aggregated crystals with a ZSM-45 structure.

Example 2

Preparation of FER washwater seeds.

14.85 parts of sodium aluminate (54% $Al_2O_3$, 37% $Na_2O$, 6% H2O), 15.59 parts of NaOH, and 5.27 parts KOH were dissolved in 143.27 parts of water with boiling. This solution was cooled to room temperature and water loss compensated to form Solution A. 256.90 parts of colloidal silica were poured into a mixer beaker together with 100.03 parts of choline chloride dissolved in 74.99 parts of water, plus 25 parts of rinse water. The very viscous mass was stirred slowly then Solution A was poured in, with 33.35 parts of rinse water. After stirring for 10 minutes, a homogeneous synthesis mixture of the following molar composition was obtained, R representing choline chloride:

1.95 $Na_2O$: 0.23 $K_2O$: 0.46 $Al_2O_3$: 10$SiO_2$: 4.15R: 157 $H_2O$

To 241.9 parts of this synthesis mixture were added 3.163 parts of a 4.6% solids content LEV washwater seed suspension produced as described in Example 1, to give a seeding level of 0.06%. After this addition, the mixture Was stirred for 5 minutes before being transferred to a stainless steel autoclave, which was heated without stirring over a period of 1.5 hours to 150° C., at which temperature it was maintained for 48 hours.

After cooling, the solid zeolite was separated from the mother liquor by centrifuging, the solid redispersed in 700 parts of demineralized water and recovered by centrifuging. This was repeated 4 times, the supernatant gradually becoming more hazy. The fifth time, the supernatant was recovered; the solids content was determined gravimetrically to be 0.06%.

XRD patterns of the dried precipitate and solids from the fifth supernatant correspond to the pattern given in U.S. Pat. No. 4 046 859 for ZSM-38, a FER type zeolite. Example 3

Preparation of ZSM-22 (TON) washwater seeds.

Solution A was prepared by dissolving successively 29.00 parts of $Al_2(SO_4)_3 . 8 H_{20}$, 65.00 parts of KOH (87.4%) and 37.23 parts of 1,6-diaminohexane (R) in 926.57 parts of water at room temperature with stirring in a glass beaker. A clear solution was obtained. 2.75 parts of ZSM-22 powder seeds were mixed with 604.43 parts of Ludox AS40 (40%). Solution A was added to this mixture using 137.55 parts of water. The contents of the beaker were mixed for 8 minutes. A visually homogeneous gel was obtained. The molar composition of the synthesis mixture was:

11.64 $K_2O$: 7.37R: $Al_2O_3$: 92.5 $SiO_2$: 1850 $H_2O$.

1670 parts of the gel were transferred to a stainless steel autoclave. The mixture was stirred and the autoclave was heated up to 154° C. over 4 hours and kept at this temperature for 24 hours.

After cooling, the procedure of Example 2 was repeated, except that the fourth supernatant was recovered, yielding a suspension with a solids content of 0.058%. When dried, the solids gave an XRD pattern corresponding to ZSM-22.

Example 4

Preparation of ZSM-57 (MFS) washwater seeds.

11.14 parts of $Al_2(SO_4)_3$. 18$H_2O$ and 16.25 parts of NaOH were dissolved in 99.97 parts of water to give solution A. 150.02 parts of colloidal silica were mixed with 400.21 parts of water forming mixture B. 43.41 parts of N,N,N,N',N',N'-hexaethylpentane diammonium bromide (R) in 97.36 parts of water were added, followed by 11.53 parts of rinse water, to mixture B, and stirred for 5 minutes. Solution A was added with 12.10 parts rinse water, and mixed for a further 5 minutes to yield a gel with a molar composition of:

2$Na_2O$: R: 0.17 $Al_2O_3$: 10 $SiO_2$: 400 $H_2O$ 537 parts of the gel were transferred to a stainless steel autoclave equipped with a stirrer. The autoclave was heated to 160° C. in 6 hours, while the mixture was stirred at 120 rpm. Heating at 160° C. and stirring were continued for 144 hours.

The content of the autoclave was transferred to a centrifuge bottle and washed by decanting the supernatant and dispersing the precipitate in water. After the second wash the supernatant was not clear and was recovered. This washing was repeated until the pH of the supernatant was 10.5. The washed product was dried overnight at 120° C.

The main product was shown by XRD to be pure ZSM-57, SEM, showed platelets 400 nm to 1 μm across and~100 nm thick.

The solids content of the dispersion was 0.09%, the material was pure ZSM-57, shown by SEM to be non-aggregated platelets 400 nm–1 μm across and~100 nm thick, slightly smaller than the main product.

Example 5

Preparation of MOR washwater seeds.

7.20 parts of NaOH, 26.90 parts of KOH, and 11.32 parts of $Al(OH)_3$ (99.3%) were dissolved in 75 parts of water with boiling. The solution was cooled to room temperature and water loss compensated to form solution A. 229.83 parts of colloidal silica in 256.93 parts of water were poured into a mixer beaker, followed by 68.70 parts of tetraethylammonium hydroxide (TEAOH) in 100.02 parts of water, followed in turn by 10.14 parts of rinse water. Solution A was added, followed by 15.27 parts of rinse water, and the whole mixed for 10 minutes to form a very smooth gel of molar composition:

1.22TEAOH: 0.58 $Na_2O$: 1.37 $K_2O$: 0.47 $Al_2O_3$: 10 $SiO_2$: 235 $H_2O$

To 689.5 parts of this synthesis mixture were added 3.017 parts of a 4.6% solids content LEV colloidal sol produced as described in Example 1 to give a seeding level of 0.02 t (200 ppm) by weight.

The seeded synthesis mixture was placed in a stainless steel autoclave, heated to 150° C. over 1.5 hours, and maintained at 150° C. for 96 hours. As a comparison an otherwise identical but unseeded synthesis mixture was similarly treated, with spot samples being taken and the heating continued for 240 hours.

After 96 hours, a bulk product of crystals had settled on the base of the autoclave of the seeded sample. These were washed several times. The washwaters were not clear and those after the second were combined to yield a solids content of 0.26% crystals shown by XRD to be MOR, as was the bulk product. The washwater seeds were non-aggregated and had a crystal size between 0.2 and 0.5 µm, contaminated with some; OFF needles. The unseeded comparison had only amorphous material after 48 and 96 hours while, after 240 hours, the product was 5 to 10 µm MOR crystals contaminated with a few OFF needles and amorphous product.

This example, besides providing MOR washwater seeds, also illustrates the acceleration of the synthesis by LEV washwater seeds together with the reduction in crystal size and control of size distribution of the bulk Mordenite product.

Part B—Use of Washwater Seeds

Example 6

This example illustrates the use of LEV seeds to accelerate the formation of LEV (ZSM-45).

A synthesis mixture was prepared as described in the first part of Example 1, except that instead of seeding with conventionally sized LEV seeds, the colloidal sol from the second supernatant of the second part of Example 1 was used, at a seeding level of 0.15% by weight of solids. The seeded synthesis mixture was heated in a stainless steel autoclave for 96 hours at 120° C., with a heat-up time of 3 hours. The product, recovered by centrifuging and drying, had an XRD pattern corresponding to ZSM-45. The first supernatant was not clear and yielded, after centrifuging at 11000 rpm and further washing, a dispersion with solids content 4.6%. The product consisted of crystals of size about 100 nm, XRD showing ZSM-45.

It can be seen that the use of washwater seeds, rather than regular sized seeds, reduces the synthesis time from 144 to 96 hours. This example also illustrates, the formation of washwater seeds.

Example 7

This example illustrates the use of the washwater seeds of Example 6 to accelerate the formation of LEV (ZSM-45)

Following the procedures of Example 6 and the first part of Example 1, synthesis mixture was prepared, but seeded with the washwater seeds of Example 6 at a level of 0.02% by weight of solids. The synthesis mixture was heated at 120° C. and spot samples taken at intervals were washed, recovered by centrifuging and drying, and subjected to XRD analysis. Crystallization had begun at 24 hours, and was complete after 48 hours. The XRD pattern of the product corresponded to that of ZSM-45.

Example 8

This example illustrates the use of the washwater seeds of Example 6 to accelerate the formation of LEV (NU-3).

A solution of 0.75 parts sodium aluminate. (53% $Al_2O_3$, 42% $Na_2O$, 6% $H_2O$), 0.61 part's NAOH, and 161.06 parts of diethyldimethyl ammonium hydroxide (R,20.4% in water) was made up, and added to 33.35 parts of silica (90%) with 2 parts of rinse water, and mixed for 10 minutes to give a low viscosity gel of molar composition:

0.27$Na_2O$: 0.17 $Al_2O_3$: 10 $SiO_2$: 5.5 R: 154$H_2O$.

To 120.58 parts of this mixture were added sufficient of the washed suspension of Example 6 to give a seeding level of 0.15% by weight, while the remainder of the mixture was left unseeded.

Both samples were treated in autoclaves for 96 hours at 130° C. While the unseeded product was very slightly hazy, it was still transparent and no product could be recovered. The seeded product contained a blue-white mother liquor and a solid phase on the autoclave base. After washing and drying the solid was observed by XRD analysis to have the pattern of NU-3 (a zeolite of LEV structure type) as set out in EP-A-40016. The particles were non-aggregated and had a particle size about 100 nm.

Example 9

This example illustrates the use of LEV seeds to accelerate NU-3 formation.

6.35 parts of alumina (Catapal VISTA, 70%) were slurried in 19.99 parts of water. Quinuclidine (R,97%), 7.2 parts, and $NH_4F$, 8.11 parts, were dissolved in 50.02 parts of water, and 7.2 parts of $H_2SO_4$ (97%) added dropwise with stirring. 29.01 parts of silica were placed in a mixer and the alumina slurry added, together with 15.02 parts rinse water. At very slow mixing speed, the slurry gelled the silica, and the ; quinuclidine solution was added with 35.81 parts of rinse water. The viscous gel was mixed for 5 minutes, to give a molar composition of:

1.6$H_2SO_4$: 5$NH_4$ F: $Al_2O_3$: 10 $SiO_2$: 5.3R: 161$H_2O$.

To 102 parts of this gel was added sufficient washwater seed suspension from Example 6 to give a seed loading of 0.06% by weight based on the total weight of the gel. The remainder was left unseeded. Both samples were heated at 170° C. for 192 hours. The products were washed and recovered by centrifuging and dried overnight at 120° C. The unseeded product was amorphous while the seeded product had the XRD pattern of NU-3, and SEM showed intergrown crystals of various morphology, of between 0.5 and 1.5 µm.

Example 10

This example illustrates the use of the washwater seeds, of Example 6 to accelerate zeolite formation and to control particle size and increase purity of ZSM-45 (LEV)

9.08 parts of sodium aluminate (as Example 2), 11.56 parts NaOH, and 3.10 parts KOH were dissolved in 85.75 parts of water by boiling and water loss compensated, to give solution A. Silica, 68.69 parts, was combined with water, 85.70 parts, and 60 parts choline chloride, and mixed at low speed. Then solution A was added, with 80.82 parts of additional water. The stirring speed was increased, and stirring continued for a further 5 minutes.

The washed suspension of Example 6 was added to part of, the mixture to give a seeding level of 0.02% by weight, and a further part was left unseeded. Both samples were heated at, 120° C. for 96 hours, and samples taken, product recovered, and dried overnight at 120° C. In the seeded sample, the XRD pattern was that of ZSM-45, consisting of spherical 1 μm aggregates built up of 100 nm particles. In the unseeded mixture, crystallisation had only just started; the mixture was subjected to a further 96 hours heating at 120° C. The product recovered was an impure ZSM-45, consisting of 6 μm aggregates.

Example 11

This example illustrates the use of FER washwater seeds in the manufacture of an FER zeolite, ZSM-35.

3.64 parts of NaOH, 2.62 parts of $Al(OH)_3$ and 20 parts of water were boiled to produce solution A. 149.46 parts of colloidal silica were weighed into a mixer beaker, and a solution of 24.12 parts pyridine, 91.05 parts water, and 34.27 parts of washwater, produced as described in Example 2, were added, after which solution A was added followed by a further 23.97 parts of washwater used as rinse water for solution A. The resulting molar composition was:

0.45 $Na_2O$: 3.1 pyridine: 0.166 $Al_2O_3$: 10 $SiO_2$: 145 $H_2O$ plus 255 ppm by weight washwater seeds.

The synthesis mixture was heated in a stainless steel autoclave over the course of 2 hours to 150° C., where it was maintained for 140 hours. After cooling, the solids content was washed five times to pH 10.5, and dried overnight at 120° C. XRD analysis showed the product to be ZSM-35.

In a comparison example, using the same synthesis mixture but without seeds, an identical synthesis procedure C20 was used, the resulting product being largely amorphous with a trace of ZSM-5.

Example 12

In this example, the effect on ZSM-22 production of washwater seeds was compared with the effect of conventional (1 μm powder) seeds and with an unseeded synthesis mixture.

In each case, 1,6-diaminohexane (R) was used as organic template, and Ludox AS 40 (an ammonia-based colloidal silica), $Al_2(SO_4)_3$. $18H_2O$, KOH, and water were used to make up a synthesis mixture of molar composition:

1.26 $K_{2O}$: 3.0 R: 0.108 $Al_2O_3$: 10 $SiO_2$: 400 $H_2O$.

In a procedure according to the invention, washwater containing seeds produced as detailed in Example 3 was used to give 0.04% by weight ZSM-22 seeds. In a first comparison example no seeds were added while in a second comparison 0.04% seeds were provided using conventional ZSM-22 powder.

In each of the three cases, synthesis mixtures were placed in autoclaves and heated to 158° C. over 2 hours. The ZSM-22 powder-seeded autoclave was maintained at temperature for 72 hours, being sampled at 24 and 46 hours. The unseeded autoclave was sampled at 48 hours, and heated for a total of 96 hours. The mixture seeded according to the invention was heated for 48 hours only.

All products were washed with water until the pH was between 9.5 and 10 (five to seven washings required). Washed samples were dried at 120° C. Yields of the products differed little. All were subjected to XRD analysis. The product of the unseeded autoclave was amorphous plus some ZSM-5 after 48 hours and pure ZSM-5 after 96 hours. The conventionally seeded product gave ZSM-22 with a little ZSM-5 after 24 hours. The product of the process according to the invention was pure ZSM-22 after 48 hours. The results show the advantage of using washwater seeds over both unseeded and conventionally seeded procedures.

Example 13

In this example, pure ZSM-22 is prepared from an aluminium poor synthesis mixture using the washwater seeds of Example 3. In U.S. Pat. No. 5 336 478, ZSM-22 is described as being obtained from a synthesis mixture in which no aluminium was added, any aluminium present being there as an impurity in other starting materials. However, all crystalline products obtained were contaminated with ZSM-48.

2.11 parts of NaOH and 12.89 parts of 1,6-diaminohexane (R) were dissolved in 175.03 parts of washwater from Example 3 containing 0.058% by weight ZSM-22 colloidal seeds. The solution was added to 54.85 parts colloidal silica (Ludox AS 40), rinsed in with 54.66 parts water and mixed by shaking for 5 minutes to yield a visually homogeneous, easily pourable, gel of molar composition:

0.71 $Na_2O$: 3.04R: 10 $SiO_2$: 400 $H_2O$ with 340 ppm seeds.

The synthesis mixture was transferred to an autoclave, heated to 150° C. over the course of 2 hours and maintained at temperature for 20 hours. After cooling, the crystalline product was separated, washed with water to a pH of 9.6 and dried at 120° C. XRD analysis showed a pure, excellently crystalline, ZSM-22; SEM showed that the product consisted of 2 μm needle shaped crystallites. Elemental analysis—SiO2: $Al_2O_3$ molar ratio 900:1.

As a comparison, the synthesis was repeated but using 0.19% by weight ZSM-22 seeds of about 6 μm. XRD showed that the product was ZSM-22 free from crystalline contaminants; EM showed that the crystals, of length about 12 μm, were contaminated with amorphous material.

Example 14

In this example, ZSM-57 washwater seeds are used to produce high purity ZSM-57.

5.57 parts of $Al_2(SO_4)_3.18H_2O$ and 8.17 parts of NaOH were dissolved in 50.02 parts of water to give solution A. 75.22 parts of colloidal silica (Ludox HS40) were dissolved in 95.01 parts of water and 105.32 parts of washwater (see Example 4) containing 0.09% ZSM-57 seeds. 21.72 parts of N,N,N,N',N',N'-hexaethylpentane diammonium bromide in 36.05 parts of water were added, followed by 9.62 parts of rinse water, and the mixture stirred. Then solution A was added with 14.89 parts of rinse water, and the solutions mixed for a further 5 minutes, to yield a gel of molar composition:

2$Na_2O$: R: 0.17 $Al_2O_3$: 10 $SiO_2$: 400 $H_2O$ with 225 ppm by weight ZSM-57 seeds.

The gel was transferred to an autoclave and heated to 160° C. over 2 hours, and maintained at that temperature (without stirring) for 196 hours. The product was pure ZSM-57, with no quartz or other contamination; the crystal size was uniform at about 3 μm.

Example 15

This example illustrates the use of MOR washwater seeds to reduce the crystal size of MOR compared with an unseeded synthesis mixture.

7.22 parts of NaOH, 26.89 parts of KOH and 11.32 parts of Al(OH)$_3$ were dissolved in 75.01 parts of water by boiling, and subsequent water loss compensation to form solution A.

229.82 parts of colloidal silica (Ludox AS40) were mixed with 256.21 parts of water, to which was added a solution of 68.69 parts of TEAOH in 100.07 parts of water, followed by 10.03 parts of rinse water. Finally solution A was added with 15.07 parts of rinse water and mixed for 10 minutes to provide a smooth gel. To 410.6 parts of this gel were added 20.26 parts of the washwater seeds prepared in Example 5. This resulted in a mixture of molar composition:

1.22 TEAOH: 0.58 Na$_2$O: 1.37 K$_{2O: 0.47}$Al$_2$O$_3$: 10 SiO$_2$: 243 H$_2$O and 128 ppm by weight MOR seeds, contaminated by OFF needles.

The synthesis mixture was heated in an autoclave over 2 hours to 150° C., and maintained at that temperature for 72 hours, The product comprised MOR crystals of 2.5 to 3 μm, contaminated with some OFF needles of length 4 to 8 μm, i.e., longer than the seed-contaminating needles.

Example 16

This example illustrates the manufacture of FER type product using washwater seeds to accelerate production and C avoid the need for an organic template.

7.21 parts of NaOH, 26.92 parts of KOH, 11.31 parts of Al (OH)$_3$ were dissolved in 75.02 parts of water by boiling and with subsequent water loss compensation to form solution A. Colloidal silica (Ludox AS40), 229.87 parts, was mixed with 407.85 parts of water. Solution A was added, followed by 14.18 parts of rinse water, and the gel stirred for 10 minutes. A LEV washwater dispersion was added, the molar composition of the synthesis mixture then being:

0.58 Na$_2$O: 1.37 K$_2$O: 0.47 AR$_2$O$_3$: 10 SiO$_2$: 235 H$_2$O plus 207 ppm LEV.

The synthesis mixture was heated in an autoclave to 150° C. over 2 hours, and maintained at that temperature for a total of 96 hours, after which time crystals had already settled on the vessel bottom. The product was FER, flake type crystals 2 Em long, slightly contaminated with OFF needles. An identical unseeded synthesis mixture containing no template which was also heated to 150° C. over 2 hours was still amorphous after 240 hours at 150° C.

What is claimed is:

1. A process for the manufacture of seed crystals of a molecular sieve selected from the group consisting of LEV, FER, TON, MFS, MFI, MOR, and ZSM-38, which comprises synthesizing the molecular sieve by treatment of an appropriate synthesis mixture, separating from the treated synthesis mixture the crystalline molecular sieve comprising particles of a first, larger, particle size in admixture with particles of a second, smaller, size suitable for use as seed crystals, treating the crystalline molecular sieve to separate the larger particles from the smaller particles, and recovering the smaller particles.

2. A process as claimed in claim 1, wherein separation is effected by dividing the treated synthesis mixture into a liquid component and a crystalline solid component, washing the solid component at least once using a washing medium, and recovering a used washing medium containing the second, smaller size, particles.

3. A process as claimed in claim 2, wherein separation is effected by decanting.

4. A process as claimed in claim 2, wherein separation is effected by centrifuging.

5. A process as claimed in claim 2, wherein separation is effected by filtering.

6. A process as claimed in claim 2, wherein the solid component is washed a plurality of times until the used washing medium becomes hazy, and the hazy washing medium is recovered.

7. A process as claimed in claim 1, wherein the second, smaller size, particles have a dimension in the range 20 to 400 nm.

8. A process as claimed in claim 1, wherein the molecular sieve is selected from the group consisting of ZSM-22, ZSM-38, ZSM45, ZSM-57, NU-3, and Mordenite.

9. A process for the manufacture of a crystalline molecular sieve by treatment of a synthesis mixture appropriate for the formation of that molecular sieve, wherein the mixture contains as seeds separated smaller particles prepared in accordance with claim 1.

10. A process as claimed in claim 9, wherein the concentration of seeds in the synthesis mixture is up to 10000 parts per million, based on the total weight of synthesis mixture.

11. A process as claimed in claim 10, wherein the concentration is within the range of 50 to 2000 parts per million.

12. In the synthesis of a crystalline molecular sieve by hydrothermal treatment of a synthesis mixture, the improvement comprising including in said synthesis mixture the seed crystals obtained by the process of claim 1 to accelerate the rate of production of the crystalline molecular sieve.

13. In the synthesis of a crystalline molecular sieve by hydrothermal treatment of a synthesis mixture, the improvement comprising including in said synthesis mixture the seed crystals obtained by the process of claim 1 to control a characteristic of the resulting crystalline molecular sieve.

14. A process as claimed in claim 13, wherein the characteristic is the purity, the phase purity, the particle shape, the particle size, or the particle size distribution.

15. In the synthesis of a crystalline molecular sieve by hydrothermal treatment of a synthesis mixture, the improvement comprising including in said synthesis mixture the seed crystals obtained by the process of claim 1 to facilitate the manufacture of a crystalline molecular sieve in a synthesis mixture substantially free from organic structure-directing agent.

16. In the synthesis of a crystalline molecular sieve by hydrothermal treatment of a synthesis mixture, the improvement comprising including in said synthesis mixture the seed crystals obtained by the process of claim 1 to facilitate the manufacture of a crystalline molecular sieve, without stirring the synthesis mixture at least after the desired synthesis temperature has been reached.

* * * * *